(12) United States Patent
Tanikawa et al.

(10) Patent No.: US 6,485,200 B2
(45) Date of Patent: Nov. 26, 2002

(54) DOUBLE-SHIELDING TYPE FOCAL-PLANE SHUTTER

(75) Inventors: Miyoshi Tanikawa, Narashino (JP); Yoichi Nakano, Narashino (JP); Hiroshi Takahashi, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/817,075

(22) Filed: Mar. 26, 2001

(65) Prior Publication Data
US 2001/0024574 A1 Sep. 27, 2001

(30) Foreign Application Priority Data
Mar. 24, 2000 (JP) ........................................ 2000-084650

(51) Int. Cl.⁷ ................................................ G03B 9/40
(52) U.S. Cl. ........................ 396/489; 396/443; 396/444
(58) Field of Search ................................. 396/489, 443, 396/444

(56) References Cited

U.S. PATENT DOCUMENTS

| | | | | | |
|---|---|---|---|---|---|
| 4,096,505 A | * | 6/1978 | Onda et al. | ................... | 396/489 |
| 4,245,905 A | * | 1/1981 | Takayama | ................... | 396/456 |
| 4,302,091 A | * | 11/1981 | Harase et al. | ................ | 396/456 |
| 4,657,366 A | * | 4/1987 | Tanabe et al. | ............... | 396/456 |
| 4,994,834 A | * | 2/1991 | Watabe et al. | ............... | 396/466 |
| 5,489,960 A | * | 2/1996 | Tanabe et al. | ............... | 396/480 |
| 6,071,019 A | * | 6/2000 | Shimada | ...................... | 396/456 |

* cited by examiner

Primary Examiner—Russell Adams
Assistant Examiner—Michelle Nguyen
(74) Attorney, Agent, or Firm—Adams & Wilks

(57) ABSTRACT

A double-shielding type focal-plane shutter has a closing blade and an opening blade for closing and opening a shutter opening to perform an exposure operation. A closing lever and an opening lever drive the closing blade and the opening blade, respectively. The closing lever has a first closing lever and a second closing lever supported coaxial with each other for undergoing pivotal movement. The second closing lever has a drive portion at a first end thereof for driving the closing blade and an engagement portion at a second end thereof. A lock lever restricts movement of the closing lever. The lock lever has a first mating engagement portion for engaging the engagement portion of the second closing lever in the predetermined position of the closing lever, and a second mating engagement portion for engaging the engagement portion of the second closing lever short of the predetermined position thereof. A set lever undergoes movement to a set position to set the closing lever, the opening lever and the lock lever to predetermined positions.

2 Claims, 7 Drawing Sheets

DOUBLE-SHIELDING TYPE FOCAL-PLANE SHUTTER

BACKGROUND OF THE INVENTION

1. Field of the Invention

The present invention relates to focal-plane shutters and, more specifically, to a double-shielding type focal-plane shutter for performing an exposure operation.

2. Background Information

In a focal-plane shutter disclosed in Japanese Utility Model Laid-Open No. 29839/1991, for example, an exposure operation is conducted by alternately reciprocating an opening shutter blade unit and a closing shutter blade unit over a shutter opening provided on a base plate. The opening and closing blade units are driven by a drive mechanism provided on a rear side of the base plate.

Shutters are classified into a single-shielding type shutter and a double-shielding type shutter in accordance with the manner of movement of the opening and closing blade units. In an initial state of a single-shielding type shutter, a closing blade is in a state in which it retreats from a shutter opening, and an opening blade is in a closed state. In contrast, in an initial state of a double-shielding type shutter, both the closing blade and the opening blade close a shutter opening.

In some single-shielding type focal-plane shutters, a closing blade, which should inherently retreat from a shutter opening in an initial state, acts to close the shutter opening due to shock or some other reason before an opening blade opens the shutter opening. In this state, when the closing blade closes the shutter opening, a closing arm for transmitting a drive force to the closing blade abuts against a pin of an opening lever which drives the opening blade, as shown in FIG. 5, to forcedly drive the opening blade from a holding state to retreat the same from the shutter opening. By the foregoing construction, before a control circuit performs shutter driving control, a flash timing switch is switched ON by the opening lever so that the control circuit can detect an abnormal operation of the shutter.

In double-shielding type focal-plane shutters, there is also the possibility that when a closing blade retreats from a shutter opening after a release operation, the closing blade closes the shutter opening due to some reason before an opening blade retreats from the shutter opening as in the single-shielding type shutter.

When the arrangement described above for the single-shielding type shutter, in which a closing arm is caused to abut against a pin of an opening lever to forcedly drive an opening blade, is applied to the double-shielding type shutter, there results a situation in which at the time of charging the shutter to an initial position, the pin of the opening lever abuts against the closing arm, thereby making it impossible for the opening blade to be returned to the initial position. The reason for this is that while in the single-shielding type shutter the opening lever cannot abut against the closing arm since the closing blade retreats from the shutter opening in an initial position, in the double-shielding type shutter both the opening blade and the closing blade close the shutter opening in an initial position. Thus, the foregoing arrangement employed in single-shielding type shutters cannot be incorporated in double-shielding type shutters. As a result, certain abnormal operations of double-shielding type shutters cannot be effectively detected.

SUMMARY OF THE INVENTION

It is an object of the present invention to provide a double-shielding type focal-plane shutter which can effectively detect an abnormal operation of the shutter by providing a closing lever having a drive pin at one end thereof for driving a closing blade and an engagement portion at another end thereof for engaging first and second mating engagement portions of a lock lever for restricting movement of the closing lever.

It is another object of the present invention to provide a double-shielding type focal-plane shutter in which engagement between the second mating engagement portion of the lock lever and the engagement portion of the closing lever places the closing blade in a closed position, in which such engagement is released immediately before the shutter returns to an initial condition, and in which engagement between the engagement portion of the closing lever and the first mating engagement portion of the lock lever causes the closing blade to retreat slightly from the closed position to prevent the drive pin of the opening lever from abutting against a closing arm of the closing blade.

The foregoing and other objects of the present invention are carried out by a double-shielding type focal-plane shutter comprising a closing blade and an opening blade for closing and opening a shutter opening, a closing lever for driving the closing blade, an opening lever for driving the opening blade, a lock lever for restricting motion of the closing lever, and a set lever for setting the closing lever, the opening lever and the lock lever in predetermined positions. The closing lever comprises a first closing lever and a second closing lever. The second closing lever and the first closing lever are supported coaxial with each other and are mounted for undergoing pivotal movement. The second closing lever is provided at one end thereof with a drive portion for driving the closing blade and at the other end thereof with an engagement portion for engaging with the lock lever. The lock lever has a first mating engagement portion and a second mating engagement portion. The engagement portion of the second closing lever engages with the second mating engagement portion of the lock lever short of a position where it is set in the predetermined position and engages with the first mating engagement portion of the lock lever to be set in the predetermined position.

Preferably, the engagement portion of the second closing lever is positioned to engage the second mating engagement portion of the lock lever after termination of an exposure operation and to thereafter release the second mating engagement portion when the set lever sets the closing lever, the opening lever and the lock lever to thereby engage the first mating engagement portion of the lock lever to hold the second closing lever in the predetermined position. Engagement between the first mating engagement portion of the lock lever and the engagement portion of the second closing lever is released when the set lever moves to a retreat position from the set position.

BRIEF DESCRIPTION OF THE DRAWINGS

The foregoing summary, as well as the following detailed description of a preferred embodiment of the invention, will be better understood when read in conjunction with the accompanying drawings. For the purpose of illustrating the invention, there is shown in the drawings an embodiment which is presently preferred. It should be understood, however, that the invention is not limited to the precise arrangement and instrumentalities shown. In the drawings.

DETAILED DESCRIPTION OF THE PREFERRED EMBODIMENT

While this invention is susceptible of embodiments in many different forms, this specification and the accompanying drawings disclose only one form as an example of the use of the invention. The invention is not intended to be limited to the embodiment so described, and the scope of the invention will be pointed out in the appended claims.

Figure 1:
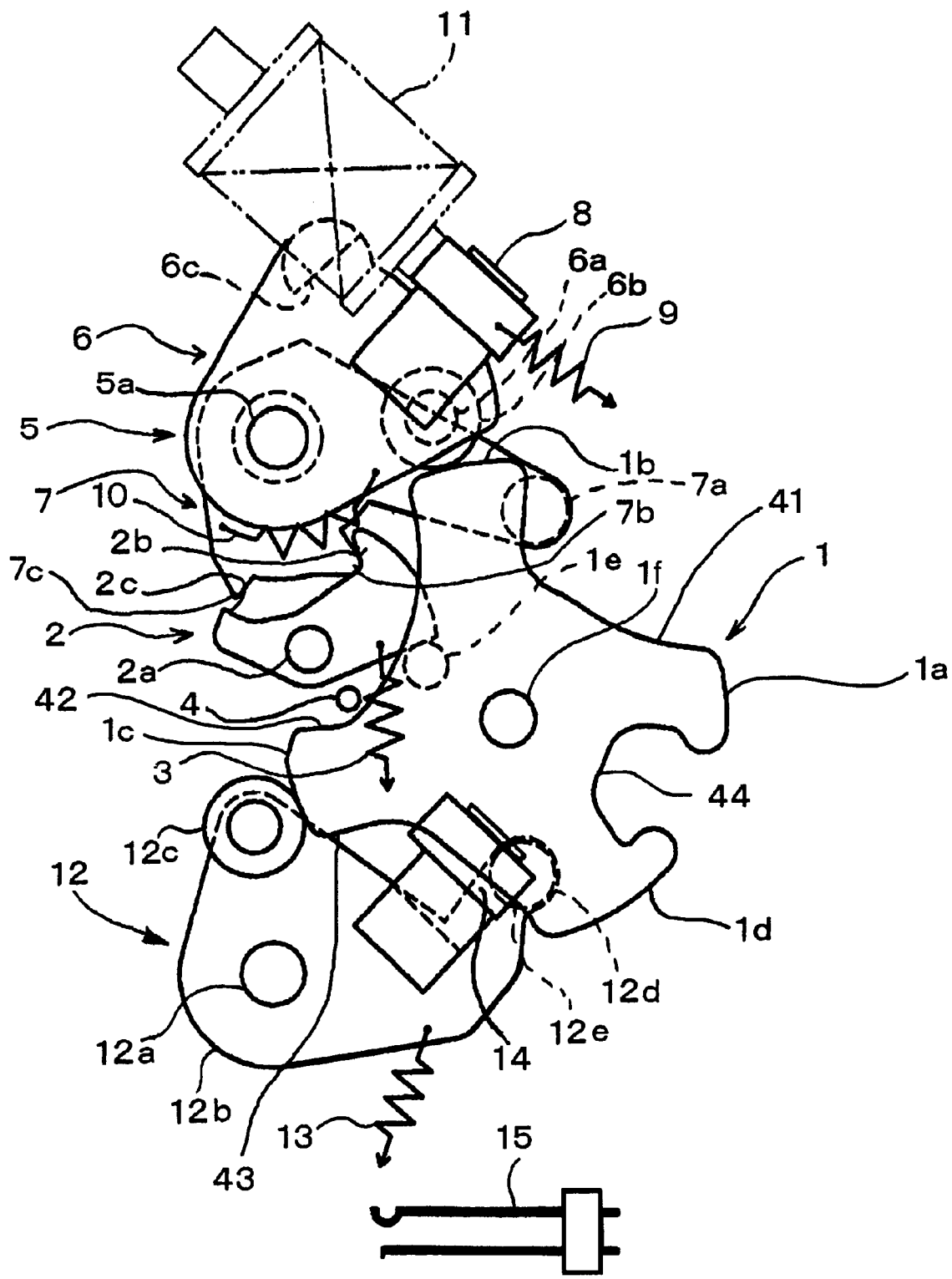
FIG. 1 is a front view showing an initial state of a shutter driving mechanism of a double-shielding type focal-plane shutter according to the present invention.
Figure 7:
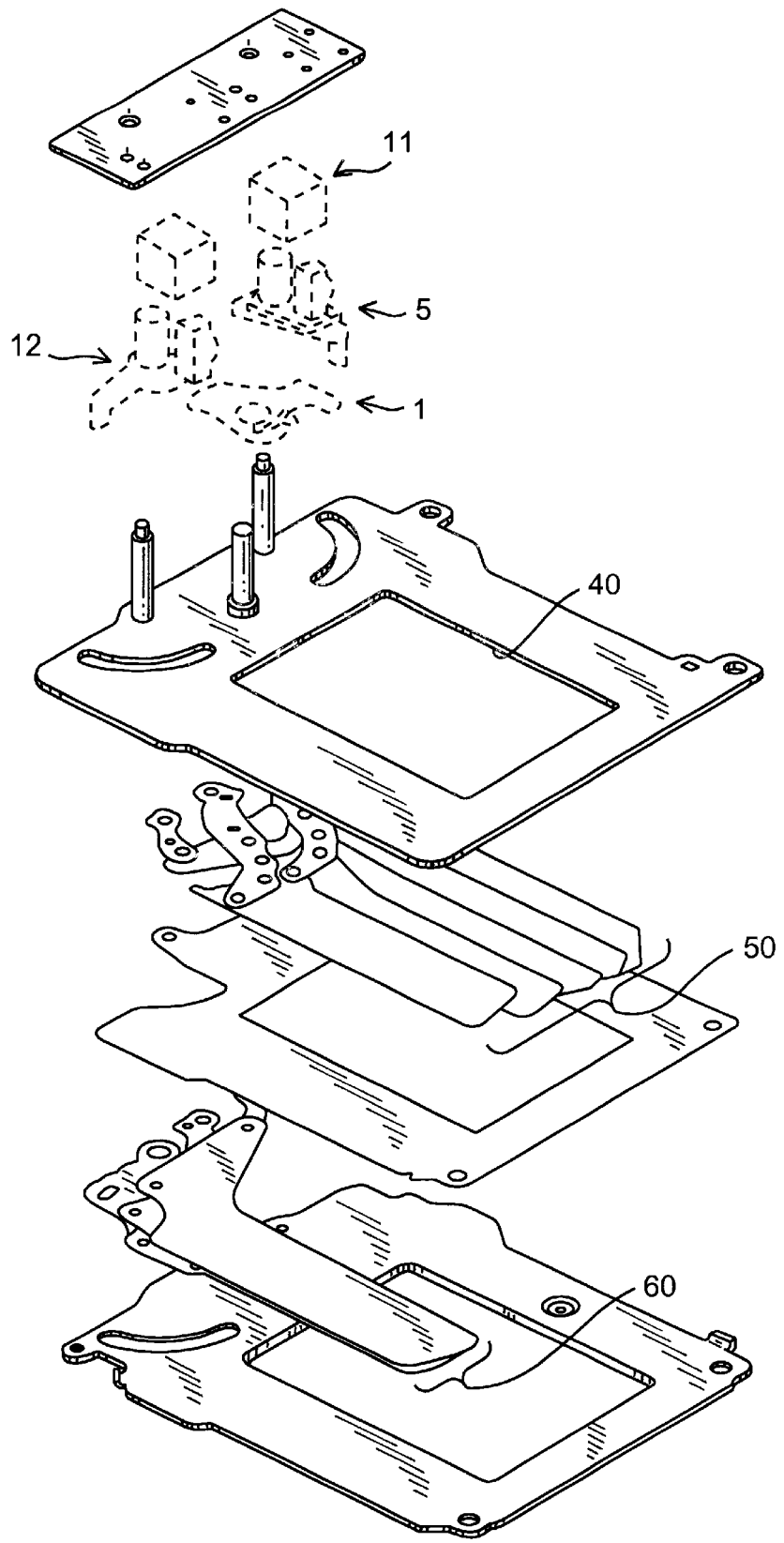
FIG. 7 is an exploded view of the double-shielding type focal-plane shutter according to the present invention.

FIG. 1 is a view in enlarged form of a shutter driving mechanism of a double-shielding type focal-plane shutter according to the present invention. In FIG. 1, conventional components of the focal-plane shutter, such as a base plate for supporting respective elements, a shutter opening, a closing blade, and an opening blade, have been omitted only for the purpose of facilitating explanation of the present invention. FIG. 7 is an exploded view of the double-shielding type focal-plane shutter showing the shutter opening 40, closing blades 50 and opening blades 60.

A set lever of the shutter driving mechanism is generally designated at 1 and is mounted on a spindle 1a projecting from a base plate (not shown). The set lever 1 is provided at an outer periphery thereof with four peninsular-shaped projections 1a–1d and bay-shaped or recessed portions 41–44 formed between the projections. The projection 1b is positioned in an upper portion of FIG. 1 and serves to set a closing lever 5 to an initial position. The projection 1c is positioned in a left portion of FIG. 1 and serves to set an opening lever 12 to an initial position.

The bay-shaped or recessed portion 44 is formed between projections 1a and 1d and allows a set lever driving lever (not shown) to undergo pivotal movement. Provided in an intermediate position between rear surfaces of the projections 1b, 1c on the set lever 1 is a set pin 1e which sets a position of a lock lever 2. The lock lever 2 is pivotally supported by a supporting shaft 2a and is biased clockwise in FIG. 1 by a tension spring 3. A lower portion of the lock lever 2 abuts against the set pin 1e provided on a rear surface of the set lever 1.

In a state shown in FIG. 1, the lock lever 2 is caused by the set pin 1e of the set lever 1 to be inclined rightwardly and upwardly against the bias of the tension spring 3. Formed on both upper ends of the lock lever 2 are a first mating engagement portion 2b and a second mating engagement portion 2c. In a state shown in FIG. 1, the second mating engagement portion 2c engages with a first engagement portion 7c of a second closing lever 7 as further described below. A stopper pin 4 is provided immediately below the lock lever 2 for restricting pivotal movement of the lock lever 2.

The closing lever 5 is disposed above the set lever 1 and the lock lever 2. The closing lever 5 is comprised of a first closing lever 6 and a second closing lever 7, both of which are pivotally supported on a base plate (not shown) through a supporting shaft 5a. The first closing lever 6 is comprised of a plate which is generally in the form of a bell-shaped vessel in front view. The first closing lever 6 is biased by a tension spring 9 in the clockwise direction. Provided partially on a rear surface of the first closing lever 6 through a roller pin 6a is a roller 6b. The first closing lever 6 has an abutting portion 6c for abutting against the second closing lever 7. A soft magnetic plate 8 is fixed to a part of an upper surface of the first closing lever 6 and is capable of being attracted by an electromagnet 11.

The second closing lever 7 comprises a plate disposed on and in contact with a lower surface of the first closing lever 6. The second closing lever 7 is generally shaped like a pistol in front view and has a drive pin 7a disposed on a lower surface of a tip end thereof. The drive pin 7a serves to drive a closing arm 21 shown in FIG. 5, and is shown in FIG. 1 as being in a state in which the closing arm 21 is inclined downward with a closing blade (not shown) closing a shutter opening (not shown).

The second closing lever 7 has a first engagement portion 7b shown at a right side in FIG. 1 and a second engagement portion 7c shown at a left side of FIG. 1 and comprised of a projection disposed at a base end of the second closing lever. In a state shown in FIG. 1, the first mating engagement portion 2b of the lock lever 2 engages with the first engagement portion 7b of the second closing lever 7.

A tension spring 10 is provided in a stretched state between the first closing lever 6 and the second closing lever 7. The bias of the tension spring 10 causes the second closing lever 7 to be biased relative to the first closing lever 6 in a counterclockwise direction in FIG. 1.

In the state shown in FIG. 1, the first closing lever 6 is held by the projection 1b of the set lever 1 and the soft magnetic plate 8 is capable of being attracted by the electromagnet 11, while the second closing lever 7 has the first engagement portion 7b engaged by the first mating engagement portion 2b of the lock lever 2 to place the tension spring 10 in a charged condition.

An opening lever 12 is mounted on the base plate by means of a supporting shaft 12a for undergoing pivotal movement relative to the set lever 1 (e.g., in leftward and downward directions relative to the set lever 1 as shown in FIG. 1). The opening lever 12 comprises a plate 12b, a roller 12c disposed at an upper surface portion of the plate 12b, and a drive pin 12e for driving an opening arm (not shown) disposed on a projection 12d projecting from a lower surface of the plate 12b. The opening lever 12 is biased in the clockwise direction by means of a tension spring 13. A soft magnetic plate 14 is fixed on the upper surface of the plate 12b. In the state shown in FIG. 1, the soft magnetic plate 14 is placed in a condition in which it is attracted by an electromagnet (not shown). A flash switch 15 is disposed below the opening lever 12. The drive pin 12e of the opening lever 12 comes into contact with the flash switch 15 to send a timing signal to a control circuit (not shown) for actuating a flash.

In the state shown in FIG. 1, the condition when the roller 12c on the upper surface of the opening lever 12 abuts against the projection 1c on the set lever 1 and the drive pin 12e is in an uppermost position indicates that an opening blade (not shown) fully closes the shutter opening.

As described above, the state shown in FIG. 1, in which the shutter is in an initial condition, corresponds to a state in which both a closing blade and an opening blade close the shutter opening, thereby establishing the double-shielding type shutter. From the state shown in FIG. 1, when a release switch of a camera (not shown) is depressed, a motor (not shown) causes the set lever 1 to turn counterclockwise to place the same in a state shown in FIG. 2.

Figure 2:
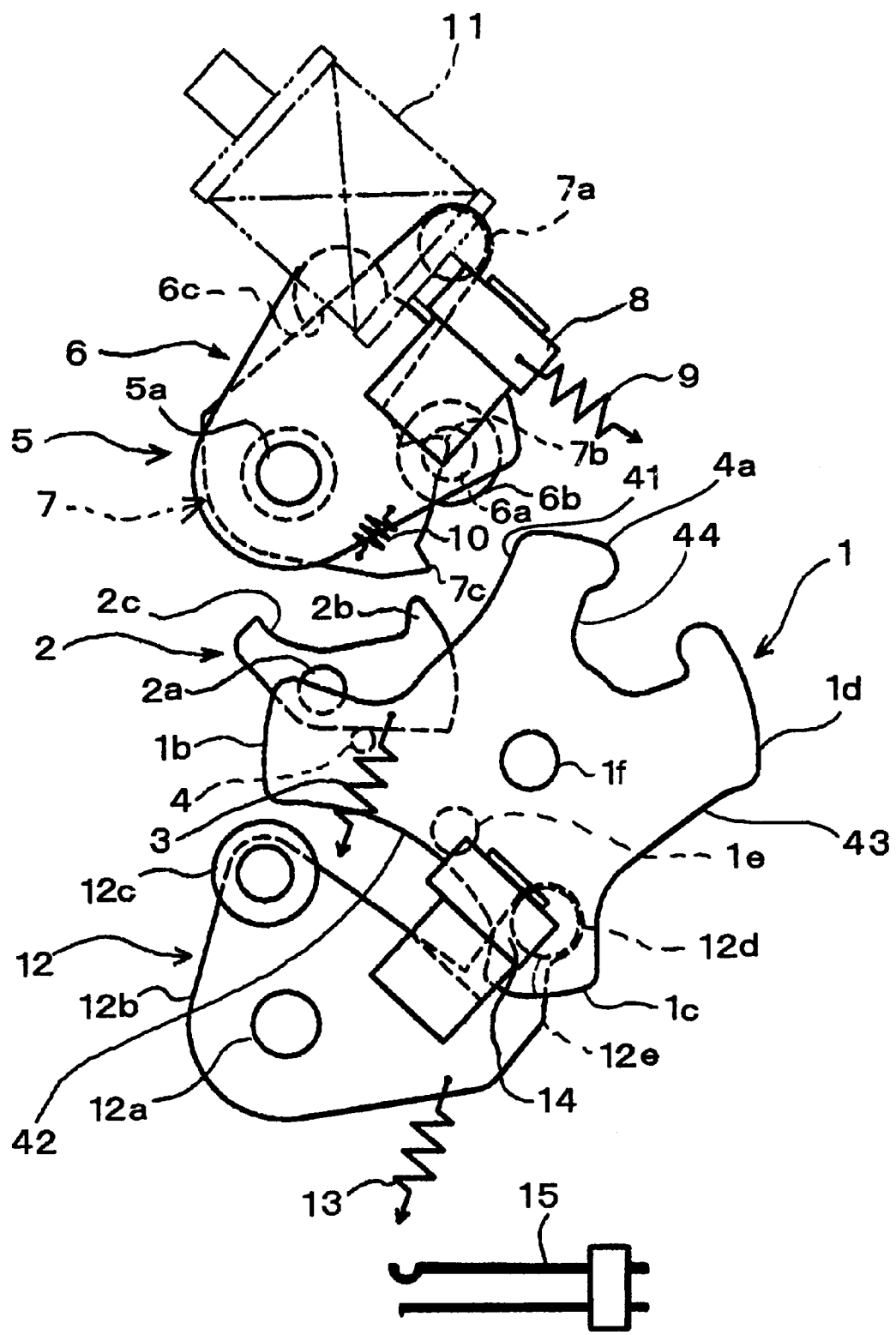
FIG. 2 is a front view showing a state of the shutter driving mechanism before an exposure operation.

In FIG. 2, the set lever 1 turns counterclockwise to disengage the set pin 1e from the lower portion of the lock lever 2, so that the lock lever 2 turns clockwise due to the bias of the tension spring 3 to cause disengagement between the first mating engagement portion 2b of the lock lever 2 and the first engagement portion 7b of the second closing lever 7. As a result, the second closing lever 7 turns counterclockwise due to the bias of the tension spring 10, so that the arm portion abuts against the abutting portion 6c of the first closing lever 6. In addition, at this time, the first closing lever 6 is in the same position as shown in FIG. 1 since the soft magnetic plate 8 is in a state of being attracted by the electromagnet 11.

The opening lever 12 is also in the same position as shown in FIG. 1 since the soft magnetic plate 14 remains attracted by an electromagnet (not shown) similar to the first closing lever 6. Accordingly, from the state shown in FIG. 1, the closing blade retreats from the shutter opening and is placed in a folded state, and the opening blade closes the shutter opening. In this state, a single shielding provided by the opening blade (not shown) is established, and is a state before an exposure operation.

Figure 3:
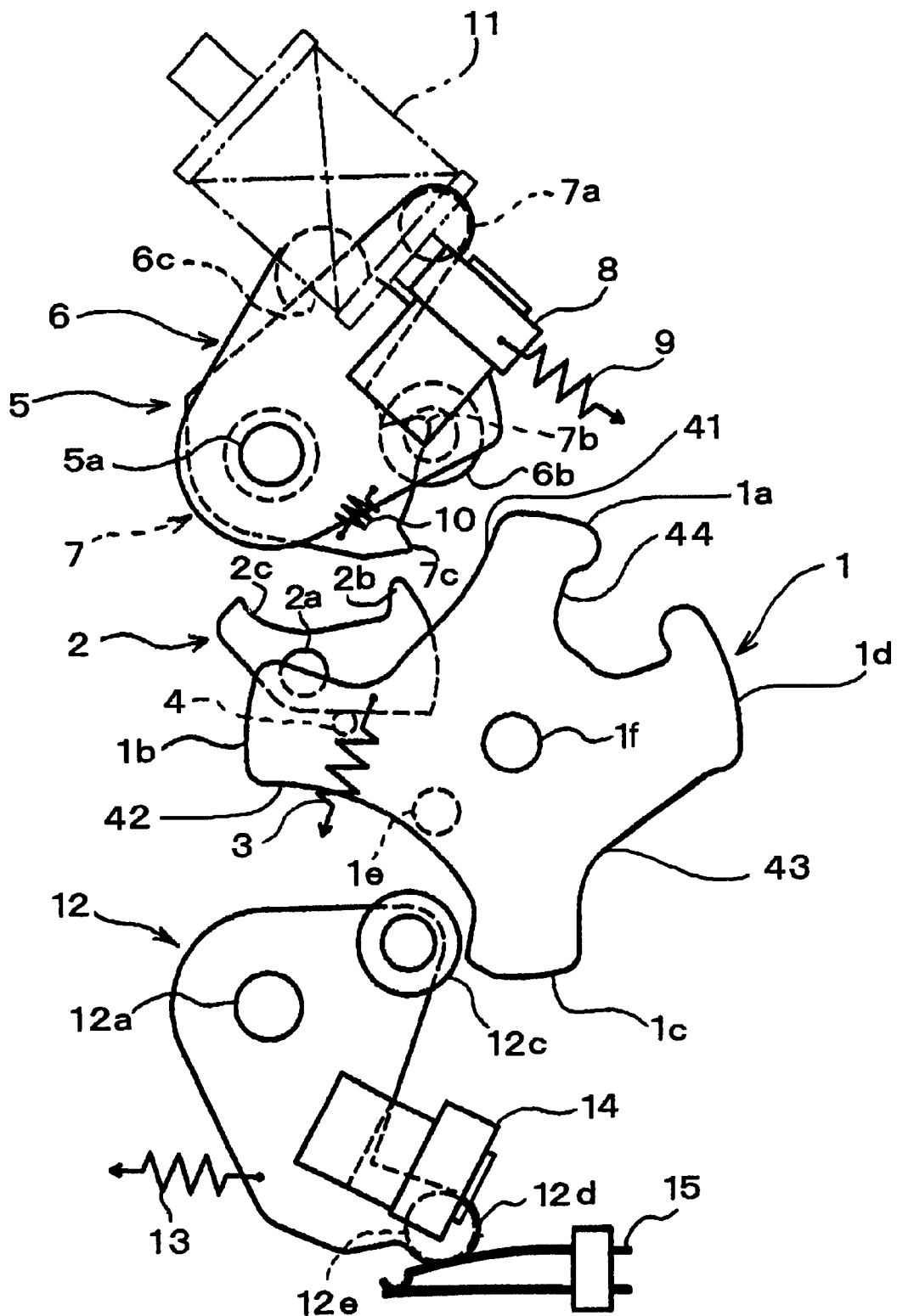
FIG. 3 is a front view showing a state of the shutter driving mechanism during an exposure operation.

When the flow of electricity to an electromagnet attracting the soft magnetic plate 14 of the opening lever 12 is stopped in the state shown in FIG. 2, the attractive force for the soft magnetic plate disappears and the opening lever 12 turns clockwise due to the bias of the tension spring 13 and achieves the state shown in FIG. 3.

In the state shown in FIG. 3, the set lever 1, the lock lever 2 and the closing lever 5 are placed in the same state as shown in FIG. 2. However, the drive pin 12e is displaced to a lowermost position since the opening lever 12 turns clockwise as described above. As a result, an exposure state is established, in which the shutter opening is opened, since the opening blade retreats from the opening and is placed in a folded state, and the closing blade remains retreated from the opening and in the folded state as described above. Thus, the opening lever 12 turns clockwise to thereby bring the projection 12d into contact with the flash switch 15 to send a timing signal to the control circuit for actuating the flash.

When the flow of electricity to the electromagnet 11 which attracts the closing lever 5 is stopped after a predetermined period of time elapses from a state shown in FIG. 3, in which both the closing blade and the opening blade are folded to fully open the shutter opening, the attractive force for the soft magnetic plate 8 disappears whereby the closing lever turns clockwise due to the bias of the tension spring 9. At this time, the second engagement portion 7c on the second closing lever 7 depresses the second mating engagement portion 2c of the lock lever 2 so that the second engagement portion 7c engages the engagement portion 2c (FIG. 4).

Figure 4:
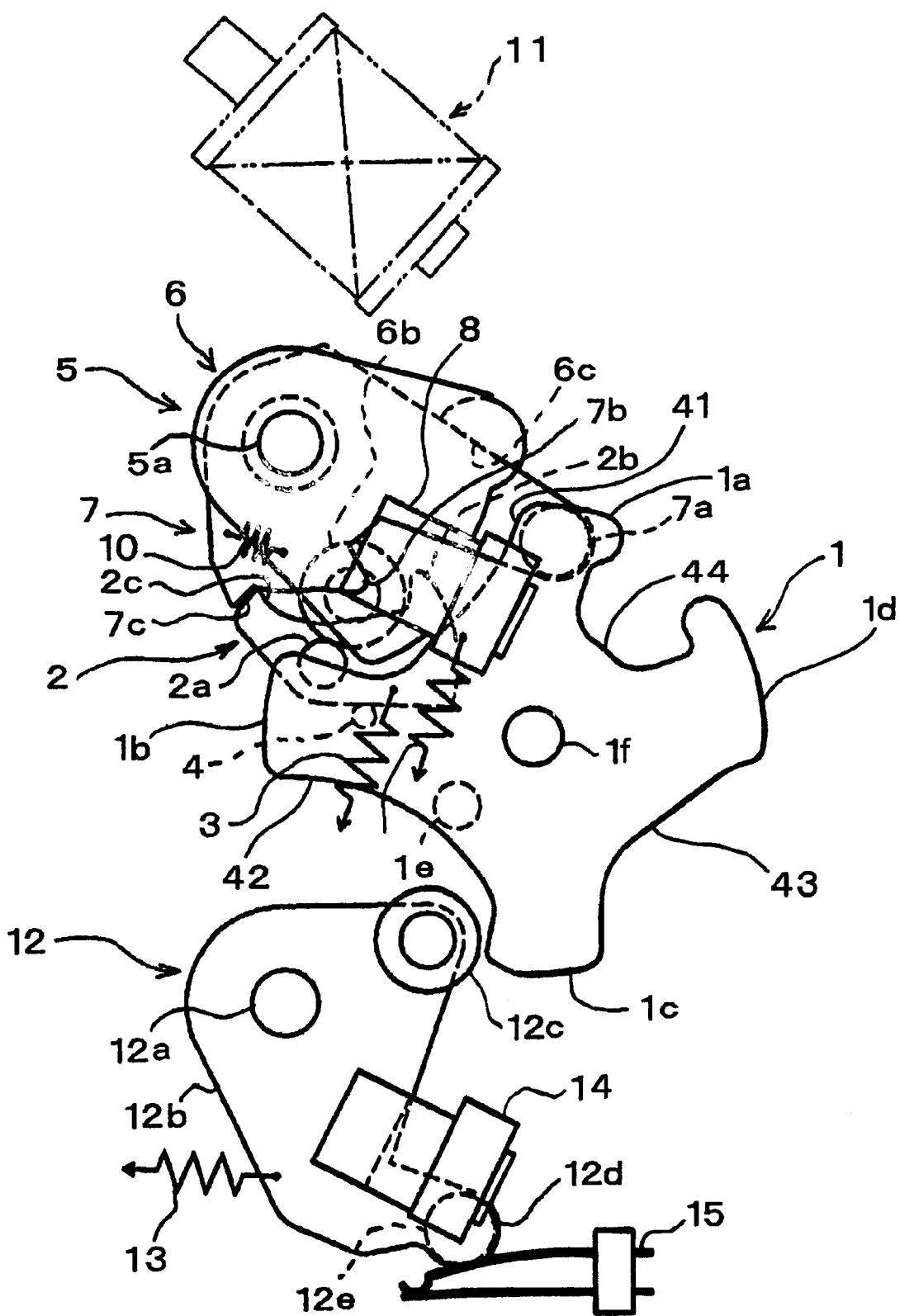
FIG. 4 is a front view showing a state of the shutter driving mechanism immediately after an exposure operation.

In the state shown in FIG. 4, the second closing lever 7 has turned clockwise from the state shown in FIG. 3 to position the drive pin 7a downward so that the closing blade is placed in a state to close the shutter opening. The closing blade closes to thereby terminate the exposure operation as well as photographing for one exposure of film. From this state, in order to set the respective members to an initial position, the set lever 1 begins to turn clockwise to start charging for returning to the initial position shown in FIG. 1.

Figure 5:
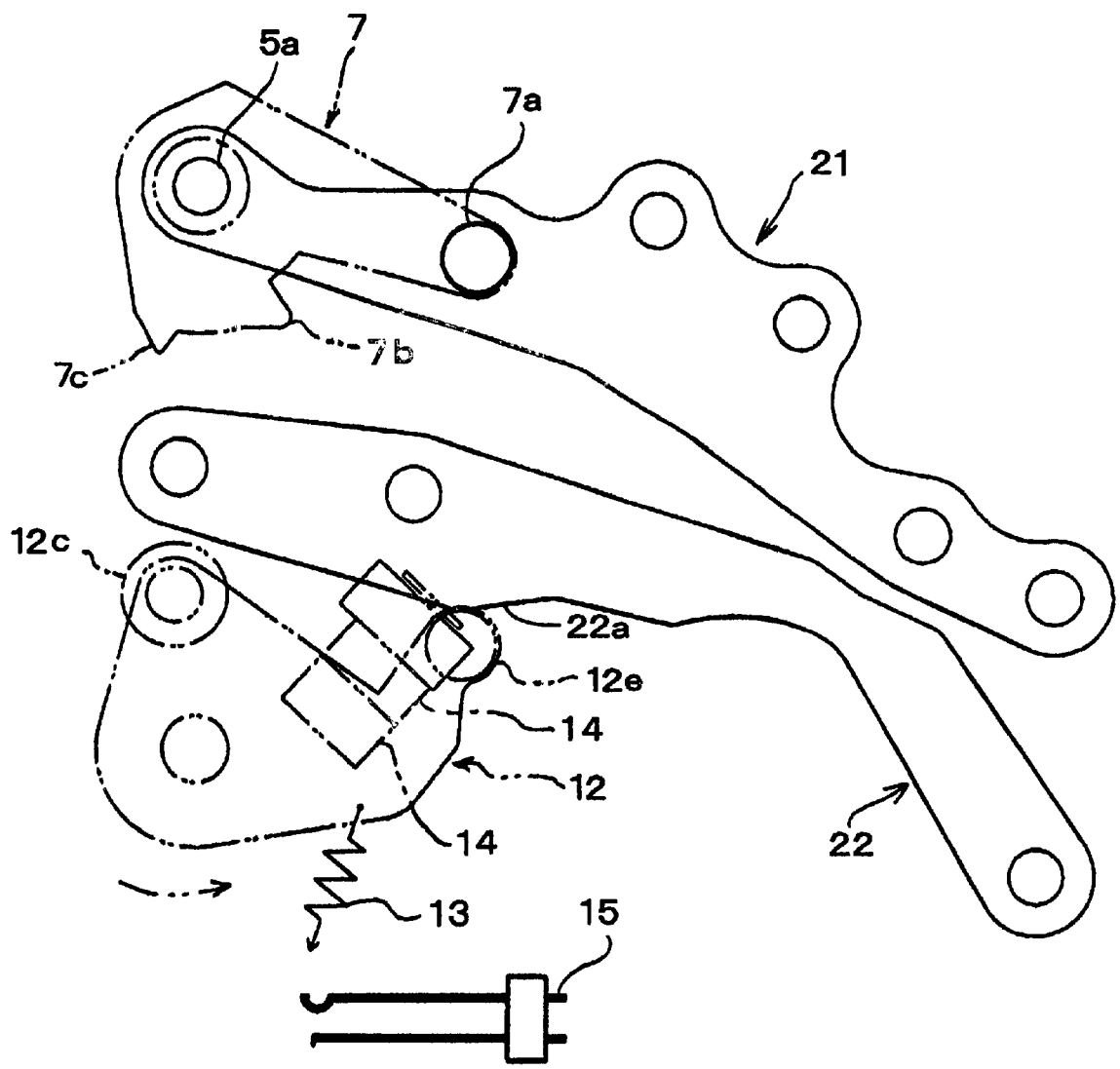
FIG. 5 is a front view showing an example of a state of the shutter driving mechanism in which a closing arm abuts against a pin on an opening lever.
Figure 6:
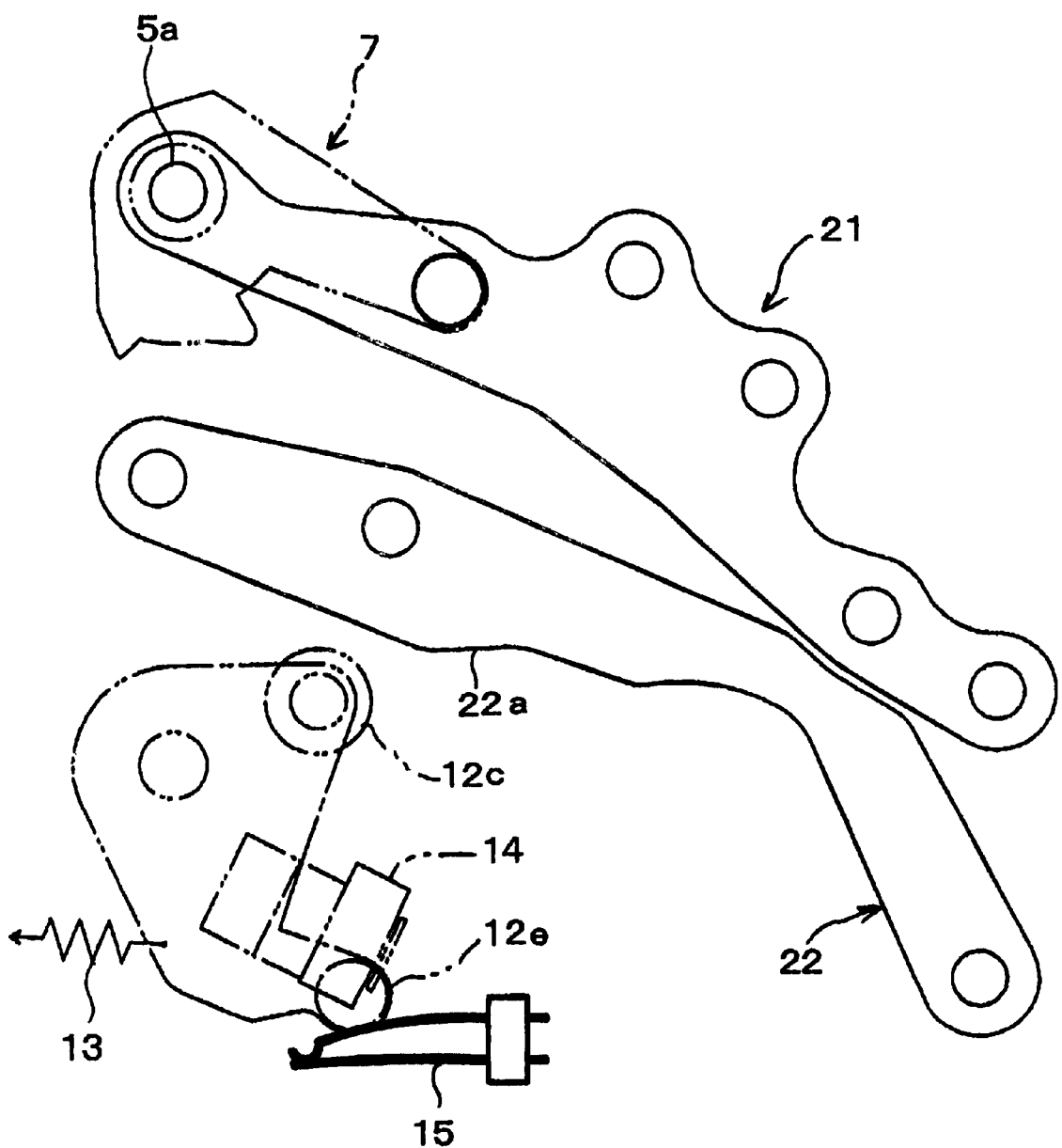
FIG. 6 is a front view showing a state of the shutter driving mechanism in which a projection of the opening lever contacts a flash timing switch.

The focal-plane shutter according to the present invention employs an abnormal motion detecting mechanism as shown in FIG. 5. The action of such mechanism has been described above with respect to the conventional art and, therefore, further description thereof is omitted herein. FIG. 5 shows a state of the shutter driving mechanism in which a closing arm 22 of a closing blade abuts against the drive pin 12e of the opening lever 12. In the state shown in FIG. 6, the opening lever 12 is shown in the position in which it has turned clockwise and the projection 12d contacts the flash switch 15.

As the set lever 1 continues to turn clockwise, the projection 1b abuts against the roller 6b to turn the first closing lever 6 counterclockwise against the bias of the tension spring 10. At this time, the second closing lever 7 is kept in position without moving since the second engagement portion 7c thereof engages with the second mating engagement portion 2c of lock lever 2. Furthermore, the projection 1c of the set lever 1 abuts against the roller 12c to turn the opening lever 12 counterclockwise against the bias of the tension spring 13.

Immediately before completion of charging, the set pin 1e of the set lever 1 abuts against the lower portion of the lock lever 2 to turn the lock lever 2 counterclockwise against the bias of the tension spring 3. Therefore, engagement between the second mating engagement portion 2c of the lock lever 2 and the second engagement portion 7c of the second closing lever 7 is released whereby the second closing lever 7 turns slightly counterclockwise due to the bias of the tension spring 10. Thereafter, the first mating engagement portion 2b of the lock lever 2 immediately engages with the first engagement portion 7b of the second closing lever 7, so that the second closing lever 7 is held in a position where it is turned slightly counterclockwise.

By virtue of the second closing lever 7 being turned slightly counterclockwise, the closing blade moves slightly upward. Therefore, as shown in FIG. 5, the closing arms 21, 22 of the closing blade move slightly upward. When the set lever 1 has completed turning clockwise in a manner to complete charging, the opening lever 12 abutting against the projection 1c of the set lever 1 comes to a position where it turns counterclockwise, and the drive pin 12e moves to an uppermost position. However, the drive pin 12e is prevented from colliding with the closing arm 22 because the second closing lever 7 has turned slightly counterclockwise as described above.

By the foregoing construction and operation of the double-shielding type focal plane shutter according to the present invention, abutment of the drive pin of the opening lever with an arm of the closing blade is effectively prevented. Accordingly, the set lever 1 can set the respective members to an initial state of the double-shielding type focal plane shutter without inconvenience.

From the foregoing description, it can be seen that the present invention comprises an improved double-shielding type focal plane shutter. It will be appreciated by those skilled in the art that obvious changes can be made to the embodiment described in the foregoing description without departing from the broad inventive concept thereof. It is understood, therefore, that this invention is not limited to the particular embodiment disclosed, but is intended to cover all obvious modifications thereof which are within the scope and the spirit of the invention as defined by the appended claims.

What is claimed is:

1. A double-shielding type focal-plane shutter comprising: a closing blade and an opening blade for closing and opening a shutter opening to perform an exposure operation; a closing lever for driving the closing blade, the closing lever having a first closing lever and a second closing lever supported coaxial with each other for undergoing pivotal movement, the second closing lever having a drive portion at a first end thereof for driving the closing blade and an engagement portion at a second end thereof; an opening lever for driving the opening blade; a lock lever for restricting movement of the closing lever and having a first mating engagement portion for engaging the engagement portion of the second closing lever in the predetermined position of the closing lever, and a second mating engagement portion for engaging the engagement portion of the second closing lever short of the predetermined position thereof; and a set lever for undergoing movement to a set position to set the closing lever, the opening lever and the lock lever to predetermined positions.

2. A focal-plane shutter according to claim 1; wherein the engagement portion of the second closing lever is positioned to engage the second mating engagement portion of the lock lever after termination of an exposure operation and to thereafter release the second mating engagement portion when the set lever sets the closing lever, the opening lever and the lock lever to thereby engage the first mating engagement portion of the lock lever to hold the second closing lever in the predetermined position; and wherein engagement between the first mating engagement portion of the lock lever and the engagement portion of the second closing lever is released when the set lever moves to a retreat position from the set position.

* * * * *